United States Patent [19]
Barker

[11] Patent Number: 5,246,200
[45] Date of Patent: Sep. 21, 1993

[54] QUICK SHUT-OFF VALVE FOR IN-LINE INSTALLATION WITH A DEFECTIVE VALVE

[76] Inventor: Paul J. Barker, 6 Center Rd., Old Greenwich, Conn. 06870

[21] Appl. No.: 941,227

[22] Filed: Sep. 2, 1992

[51] Int. Cl.$^5$ ............................................. F16K 3/22
[52] U.S. Cl. ................................... 251/148; 137/556; 137/614; 251/152; 251/288; 251/315
[58] Field of Search ................. 137/15, 556, 556.6, 137/614; 251/148, 152, 288, 315

[56] References Cited

U.S. PATENT DOCUMENTS

| | | | |
|---|---|---|---|
| 958,073 | 5/1910 | Barnstead | 137/614 |
| 1,287,107 | 12/1918 | Robertson | 251/266 |
| 1,414,118 | 4/1922 | Eller et al. | 251/266 |
| 2,039,220 | 4/1936 | Heggem | 137/556 X |
| 2,993,677 | 7/1961 | Ford | 251/148 |
| 4,508,130 | 4/1985 | Studer et al. | 137/15 |
| 4,667,928 | 5/1987 | Davatz et al. | 251/148 X |
| 4,691,726 | 9/1987 | Studer et al. | 137/15 |

Primary Examiner—Gerald A. Michalsky
Attorney, Agent, or Firm—Parmelee, Bollinger & Bramblett

[57] ABSTRACT

A trouble-shooting, one-quarter-turn quick shut-off valve is mountable directly to a compression-type fitting outlet of a defective shut-off valve in series with the defective valve so that the quick shut-off valve becomes located immediately downstream from the defective valve. Projecting from an inlet end of a housing of the quick shut-off valve is an inlet-tail-tube having an inlet passage extending axially through the inlet-tail-tube. This inlet-tail-tube is adapted for insertion directly into a socket in a compression-type fitting outlet of a shut-off valve. The inlet-tail-tube is made of suitable material for making a compression connection thereto, and the outside diameter of this inlet-tail-tube is equal to an outside diameter often used for flexible plumbing tubing of the type adapted for insertion into a socket of a compression-type fitting for enabling a compression connection to be made between the inlet-tail-tube and the compression-type socket into which the inlet-tail-tube has been inserted. The inlet-tail-tube is shown provided on an inlet fitting having an exteriorly threaded downstream projection screwed into a socket on the inlet end of the valve housing with a recess holding a seat seal against a quarter-turn rotatable valve element. This valve is also adapted to serve as a high-quality, convenient-to-install, premium valve unit for use in a new plumbing installation.

14 Claims, 5 Drawing Sheets

QUICK SHUT-OFF VALVE FOR IN-LINE INSTALLATION WITH A DEFECTIVE VALVE

FIELD OF THE INVENTION

The present invention is in the field of shut-off valves for installation in supply lines for plumbing fixtures. More particularly this invention relates to a quick shut-off valve which shuts in a one-quarter turn for convenient installation in-line in series with an existing defective valve in a supply line leading to a plumbing fixture, such as a wash basin or toilet tank or the like. Also, this quick shut-off valve is adapted for serving as a high-quality, easy-to-install, premium valve unit for incorporation in a new plumbing installation.

BACKGROUND

Many plumbing fixtures, such as wash basins and toilet tanks, have water supply lines leading to them equipped with relatively small shut-off valves that plumbers refer to as "Speedy" valves. A flex tube often extends from the outlet side of the "Speedy" valve to the fixture, and this flex tube often is connected to the outlet of the valve by a compression fitting. When a plumber is called upon to make a repair or replacement in such a wash basin or toilet, the first step is an attempt to shut off this existing small valve to prevent flow of water while doing the repair or replacement on the fixture involved.

It is not unusual for such a "Speedy" valve which has been in its open condition for many years to become defective by sticking in its full-open position or for its valve stem to be covered by corrosion or mineral deposits so that the handle on the stem cannot be turned completely off. Sometimes the valve seat itself becomes eroded or irregularly mineral coated such that the valve leaks significantly even when strenuous attempts are made to turn the valve handle to a fully off position.

When a plumber is faced with a situation where an existing supply line valve has become defective such that it permits significant incoming water flow to continue, then the plumber must deal with two unattractive alternative procedures.

1. One alternative is to attempt to make needed repairs on a fixture while trying to use rags, sponges and buckets to staunch unwanted incoming flow of water coming in through the defective existing shut-off valve. Often the plumber is working in a cramped space, lying on a floor facing upwardly underneath the wash basin or toilet tank being repaired, and it is not unusual in such situations that the incoming water is squirting into the plumber's eyes or onto the plumber's face and running down his neck.

2. The other alternative procedure is to attempt to trace back a supply pipe line for that particular fixture hoping to locate a main shut-off valve which can be used for temporarily stopping the incoming flow. In an apartment building, it is sometimes necessary for the plumber to go down into a basement so as to shut off a main riser for a whole tier of apartments, because a shut-off valve for a particular apartment in which a fixture to be repaired is situated is inaccessible in a locked service cabinet with missing key or is inoperative. When a plumber has trudged down into a basement it often is very difficult to ascertain which is an appropriate main riser valve to be turned off. Often the respective riser valves have not been tagged nor marked with identifications telling which tiers of apartments they control. Moreover, after an appropriate riser shut off valve is located and is closed, other tenants in other apartments along that riser soon become annoyed by lack of water, while a needed fixture repair or replacement is being accomplished in one particular apartment.

Considerable frustrating time is lost while a plumber goes down into a basement seeking a hoped-for riser shut-off valve, experimentally turning off a promising valve, then in coming back up to the apartment only to find out that the wrong valve was turned off, necessitating another trip down to the basement, amid possible complaints from neighboring tenants, etc.

U.S. Pat. No. 1,287,107—Robertson shows valves for a steam heating system of vintage 1918. In FIG. 1 a valve plunger opens downwardly, and in FIG. 4 a valve plunger opens upwardly. FIG. 2 shows that the valve handle turns 180° between "ON" and "OFF" positions. This Robertson steam valve is cited because it happens to disclose female and male connections at 3 and 4, respectively, on "induction and eduction necks 3 and 4" (Col. 1, lines 38-39). However, both the male and female connections are threaded. Both the male and female connections are of large diameter suited for steam (gaseous) flow not of modest size as is typical for water (liquid) flow.

U.S. Pat. No. 1,414,118—Eller et al discloses a valve having a plunger 6 (FIG. 4) with a pair of ears 8 (FIG. 2) sliding in grooves 7 for preventing the plunger 6 from rotating as it is moved up and down by turning a handle 22, 23. Multiple turns of the handle are required for moving the plunger from fully closed to fully open. The inlet passage 2 is located in a neck which is both male and female threaded. The outlet passage 3 is located in a male threaded neck.

U.S. Pat. Nos. 4,508,130 and 4,691,726—Studer et al are directed to solving plumbing repair problems. Both of these patents describe solutions to plumbing repair problems. These solutions are considerably more complex and are more time-consuming than the problem-solving capability afforded by the described embodiment of the present invention. In addition, both of these prior patents involve temporary use of a main shut-off valve. Neither of these Studer et al patents discloses nor suggests a downstream repair problem where a main shut-off valve is inaccessible, inoperative or remotely located in a basement among an array of shut-off valves whose identifies or control functions are not identified. In contrast to Studer et al's repair sequence, the present invention advantageously avoids any need to seek and to shut off any main valve.

In Studer et al U.S. Pat. No. 4,508,130, FIG. 1 shows a leak at 38 in pipe 24 located in a crawl space beneath a floor 14. In order to repair this leak 38, these joint inventors describe a procedure involving a sequence of steps as follows:

(A) An accessible exterior main shut-off valve 22 is closed; (B) in FIG. 2, a desired pipe-cutting location 92 is selected; (C) in FIG. 2, the pipe 24 is cut in two places at this selected position 92 so that a short length 94 of the pipe 24 can be removed; (D) in FIG. 3, the spacing of the two cuts leaves a gap 96 equal to the spacing between two socket-stop shoulders 72 (FIG. 5) of their new valve 40; (E) in FIG. 4, their new valve 40 is installed in the gap between the two cut ends of the pipe; (F) their new valve 40 has compression fittings at each end; (G) their new valve is installed and then is shut; (H)

the main shut-off valve 22 now is re-opened so that water will be available elsewhere in the building; (I) the leak 38 is repaired as shown at 98 in FIG. 4; (J) their new valve 40 is now opened for leak-proof testing of the repair 98. When repair 98 has been made and tested to be leak-proof, this new valve 40 is turned permanently open. Thus, this new valve becomes part of the supply pipe.

There is no discussion nor suggestion in this Studer et al '130 Patent concerning the problems associated with attempting to make a repair downstream from a leaky localized shut-off "Speedy" valve, where a main shut-off valve is inaccessible, defective, unidentifiable or is impractical to use, because shutting it off would inconvenience too many other tenants in a large building.

In Studer et al '130 the inventors are concerned about the difficulty of repeatedly squirming in and out of a crawl space. They want to shut off the main valve 22 once. Then, they squirm into the crawl space to install and shut off their new valve 40. Then, they get out of the crawl space to open the main valve 22. Then they get back into the crawl space for making repair 98. Their new valve 40 enables them to complete and to leak-proof test their repair 98 while remaining in the crawl space and then to leave new valve 40 in a permanently full-open position. They fully assume that the main shut-off valve 22 is accessible, is fully operational and is practical for them to use for temporary shut-off purposes.

In the other Studer et al patent '726, the patentees describe a water tank 32 (FIG. 1) where the existing valve assembly 38 needs to be replaced. They are not making a repair downstream from the existing valve assembly 38; they are replacing it.

Their valve-replacement procedure is: (A) turn off an accessible main shut-off valve 22; (B) cut the inlet pipe 40 (FIG. 3) adjacent to the inlet side 48 (FIG. 3) of the existing valve assembly 38; (C) remove the existing valve by disconnecting a flex-tube connection 52; (D) install a new valve 70 using a compression fitting 74 (FIG. 5) for connection to the cut end of the inlet pipe 40; (E) connect the flex-tube connection 52 to the compression fitting at the downstream side of their new valve 70; (F) open the main shut-off valve 22.

In Studer et al '726, the patentees do not teach nor suggest that their new valve 70 is to be installed downstream from and in series with the existing defective valve assembly 38. This existing defective valve has soldered connections. Its downstream end is soldered to a short piece of pipe 68 which in turn is soldered to a downstream adapter 60 which is exteriorly threaded (male end fitting 60).

Moreover, their new valve 70 has two male threaded ends 96 and 124. Thus, their new valve 70 is not adapted for direct connection immediately downstream from the existing valve assembly 38, since this existing valve assembly already has an adapter 60 with an exteriorly threaded male end 62 (Col. 5, lines 40-42). It will be understood that an exteriorly threaded male fitting is not directly connectable to another exteriorly threaded male fitting.

The patentees in Studer et al '726 wish to avoid making a soldered "sweat" plumbing connection close to an interior wood-stud wall 18 where the water tank is located. These inventors Studer and Schourup appear to have had considerable practical plumbing experience. Since they have not recognized the problem which the present invention has solved, namely an inaccessible, not fully operational or an impractically situated main shut-off valve, the teaching in this U.S. Pat. No. 4,691,726 serves to emphasize patentable novelty of the present invention.

SUMMARY

In accordance with the present invention, the described embodiment, which is the best mode contemplated by the inventor for putting this invention into practice, comprises a valve housing having inlet and outlet passages. A valve chamber interconnects the inlet and outlet passages, a quick shut-off rotatable valve element, shown as a ball with a port extending diametrically through the ball, is positioned in the valve chamber. This quick shut-off valve element is rotatable one-quarter turn, namely 90° between its fully open and fully closed positions. A valve stem has an inner end coupled to the valve element for turning the valve element between its fully open and fully closed positions and a handle is mounted on an outer end of the valve stem. This new valve housing further comprises: an inlet-tail-tube fitting having a longitudinally projecting inlet-tail-tube which defines the inlet passage for the valve. This inlet-tail-tube has an outside diameter ("OD") suitable for insertion directly into a socket in the externally-threaded outlet end of a Speedy valve. This Speedy valve socket normally has a flex-line inserted therein for supplying water to a plumbing fixture and the externally-threaded outlet end of the Speedy valve normally is connected in water-tight relationship to the flex-line by a compression sleeve encircling the flex line with a compression nut tightened upon the compression sleeve. This inlet-tail-tube is fabricated from suitably soft plumbing material, for example such as copper or plastic, so as to be capable of making a water-tight compression sleeve and compression nut connection between this inlet-tail-tube and the externally-threaded outlet end of a defective Speedy valve. The new valve housing also comprises an externally-threaded outlet end having a compression-fitting-type socket therein. Thus, the outlet end of the new valve is adapted to be connected directly to an existing flex-line or to a replacement new flex-line by a compression sleeve and compression nut. The compression sleeve and nut which is used to connect the existing flex-line to the outlet end of the new valve may be the same sleeve and nut which previously had been used to connect the flex-line to the outlet end of the defective Speedy valve.

Also, this quick-shut-off valve is well adapted to serve as a high-quality, convenient-to-install, premium valve unit for incorporation in a new plumbing installation.

BRIEF DESCRIPTION OF THE DRAWINGS

The invention, together with further objects, features, advantages and aspects thereof will be more clearly understood from the following description considered in conjunction with the accompanying drawings which are not necessarily drawn to scale with the emphasis instead being placed upon clearly illustrating the principles of the invention. Like reference numerals indicate like elements throughout the different views.

DETAILED DESCRIPTION OF PREFERRED EMBODIMENT

Figure 1:
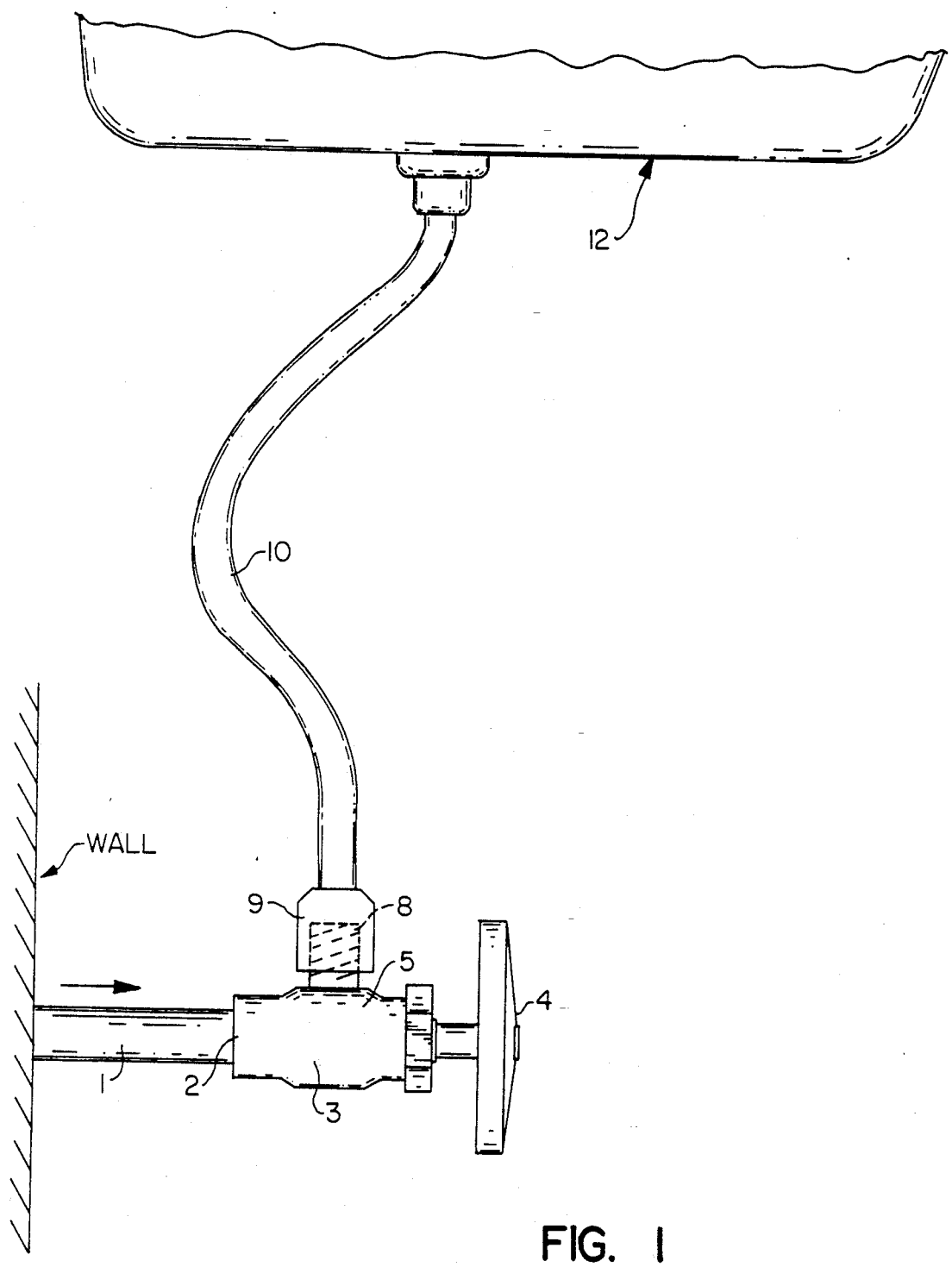
FIG. 1 is an elevational view of a plumbing installation in which an incoming supply line extends horizontally to a "Speedy" shut-off valve. A flex tube (flex-line) connects with a plumbing fixture located above the valve.

As shown in FIG. 1, an incoming water supply line 1, which may be either a cold or a hot water supply line, extends horizontally inward from a wall, for example a bathroom wall. This supply 1 feeds into an inlet 2 of an angle-stop "Speedy" shut-off valve 3 having a handle 4. The valve 3 is called an "angle-stop" valve because its outlet 5 is oriented at right angles to its inlet 2.

Figure 2:
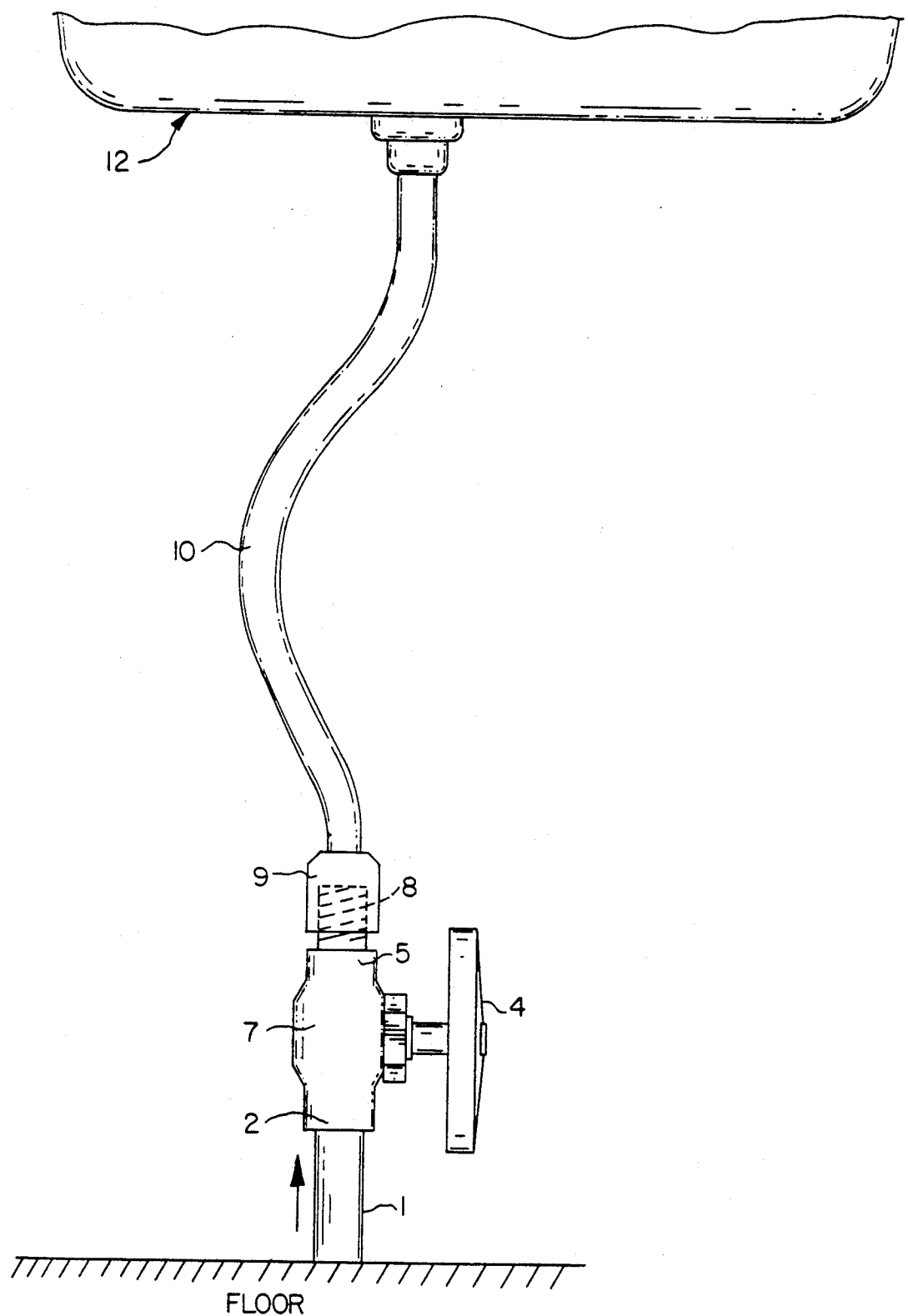
FIG. 2 is an elevational view similar to FIG. 1, except that the incoming supply line extends vertically upward from a floor.

As shown in FIG. 2, there are also "straight-through" "Speedy" valves 7 which are used when an incoming supply line 1, which may be either for cold or hot water, extends vertically from a floor, for example the floor of a bathroom.

Both valve 3 and valve 7 have an outlet 5 equipped with a screw-threaded male end 8 adapted to be joined by a compression nut 9 (and by a compression sleeve not seen within this compression nut) to a relatively flexible, bendable flex tube line 10. This flexible flow line 10 often comprises relatively small diameter, bendable tubing as is shown in FIGS. 1 and 2. For example such a flex-line 10 may be attractively coated copper tubing, such as chromium-plated copper tubing. Alternatively, such a flex-line 10 may comprise flexible plastic tubing surrounded by a protective sheath, for example a flexible sheath of braided non-corrodible wire strands. This flex-line tubing is fabricated from suitably soft material for making a water-tight connection to its lower end using a compression nut and compression sleeve as known in the art. The flex-line 10 runs up to a plumbing fixture 12, for example a wash basin, deep sink, toilet tank, or the like.

Figure 3:
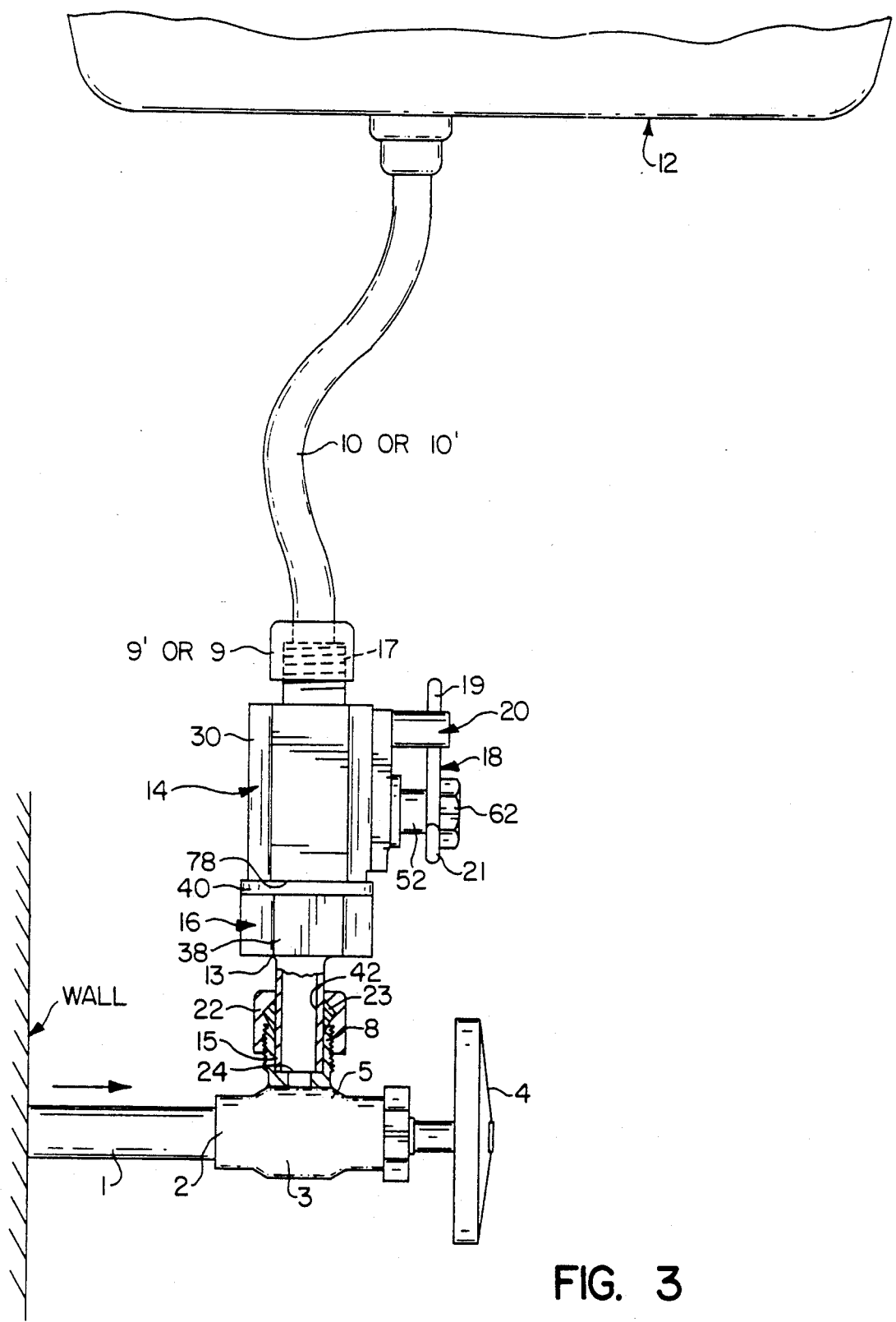
FIG. 3 is an elevational view similar to FIG. 1 showing the new quick shut-off valve embodying the present invention installed directly onto the outlet from a defective "Speedy" valve. The outlet end of the defective valve, with a compression nut and compression sleeve connected thereto, are shown in section for clarity of illustration.

In the present embodiment of the invention, a trouble-shooting, quick shut-off valve 14 (FIGS. 3, 4 and 5) has a suitably soft inlet-tail-tube 15 on a fitting 16 at its inlet end 13. This inlet-tail-tube 15 defines the inlet passage into the valve 14 and is adapted to be inserted directly into the socket within the externally-threaded male outlet compression-connection-type end 8 of a defective angle-stop "Speedy" valve 3 as is illustrated in FIG. 3 or into the socket in the outlet compression-connection-type end 8 of a defective straight-through "Speedy" valve 7 (FIG. 2). As soon as the inlet-tail-tube 15 has been inserted fully, as shown in FIG. 3, into a socket outlet 24 located in the outlet end 8 of the defective Speedy valve 3 or 7, a compression-connection-type nut 22 with a compression sleeve 23 is used quickly and easily connecting the inlet-tail-tube 15 to the compression-connection-type outlet 8.

In use and operation of the quick shut-off valve 14, a plumber first makes sure that the L-shaped valve handle 18 on a rotatable stem (Please see also FIGS. 4 and 5) is turned to its fully open position (FIG. 5) with the "ON" leg 19 of handle 18 resting against a handle stop stud 20. This L-shaped valve handle 18 is shown configured with two legs 19 and 21 (respectively "ON" and "OFF" legs) oriented 90° apart. A one-quarter turn will position the OFF leg 21 against the stop stud 20, thereby shutting this valve 14.

The reason for initially fully opening this valve 14 is that the plumber has already determined that the existing "Speedy" valve 3 or 7 is defective, and significant flow is passing through this existing valve in spite of vigorous efforts by the plumber to shut it off. When significant leakage flow is occurring, it is much easier to install an open valve 14, because the plumber thereby avoids fighting water pressure which otherwise would be resisting insertion of the inlet-tail-tube 15 into the socket 24 (FIG. 3) within the externally threaded outlet end 8 of the leaking valve 3 or 7. It is quite difficult to attempt to install a closed valve against pressure of existing flow, and such an attempt may consume considerable time. Consequently, the new valve 14 needs to be open to accommodate leakage flow for facilitating installation of the new valve as quickly as possible. The plumber wants to save time while uncontrolled leakage flow through a defective valve is occurring.

With the new valve 14 fully opened and at hand, and with a compression nut 22 and a compression sleeve 23 positioned in readiness on the short inlet-tail-tube 15, the plumber as quickly as possible unscrews the nut 9 (FIGS. 1 or 2) of the compression fitting which previously has been attaching the flex-line 10 to the threaded outlet 8 of the valve 3 or 7. As soon as this sleeve 9 begins to be loosened, there will be an amount of leakage (spurting or spraying) of water from between this sleeve and the threaded outlet 8, depending on the amount of leakage flow through defective valve 3 or 7. Quickly, the lower end of flex-line 10, together with the disconnected compression nut 9 and its compression sleeve, are temporarily shifted out of the way.

As soon as the lower end of flex-line 10 has been removed from the socket 24 (FIG. 3), the inlet-tail-tube 15 of the new valve 14, already prepared by putting thereon an encircling compression sleeve 23 with an encircling compression nut 22 resting loosely over the compression sleeve, as mentioned above, is inserted into the empty socket 24. The compression nut 22 is quickly tightened for completing connection of the inlet-tail-tube 1 to the outlet end 8 of the defective valve 3 or 7. Then, the handle 18 is turned one-quarter turn putting the "OFF" arm 21 against the stop stud 20, thereby shutting off all leakage due to defective valve 3 or 7. The leakage flow has been stopped, and the plumber can proceed to make the needed repairs or replacement in fixture 12.

The plumber may decide to re-use the existing flex-line 10 and existing compression nut 9 with a compression sleeve (not seen) which is already in place on the flex-line within the interior of this compression nut 9. Alternatively, the plumber may decide to use a new flex-line 10' (FIG. 3) and a new compression nut 9' with an accompanying new compression sleeve 64 (FIG. 4) for connecting the valve 14 to the repaired or replaced plumbing fixture 12.

Figure 4:
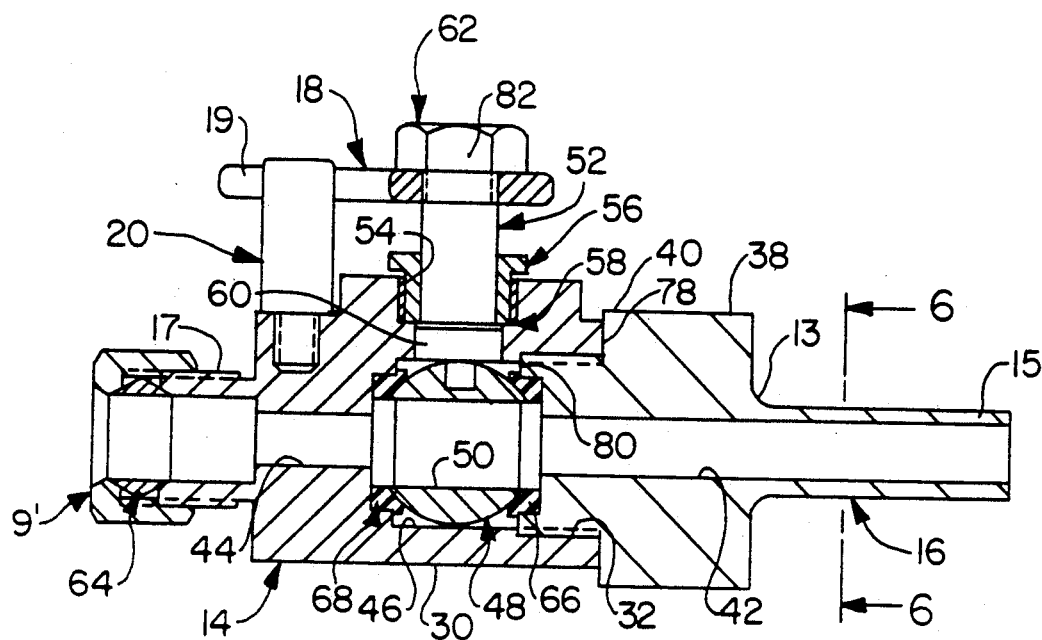
FIG. 4 is an enlarged longitudinal sectional view of a quick shut-off valve embodying the present invention adapted for installation directly onto the outlet from a defective "Speedy" valve in series relationship with the defective valve.
Figure 5:
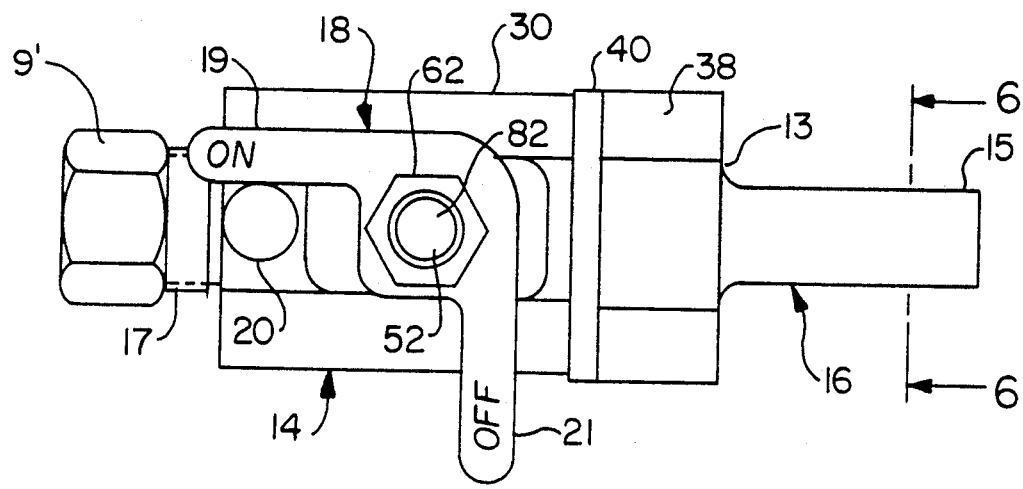
FIG. 5 is an enlarged plan view of the present quick shut-off valve shown in FIG. 4.
Figure 6:
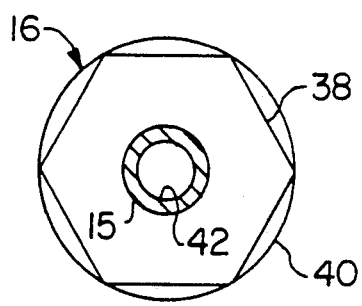
FIG. 6 is a cross sectional view taken along the plane 6—6 in FIGS. 4, 5 and 7 through a suitably soft inlet-tail-tube on an inlet fitting of the present quick shut-off valve. This inlet-tail-tube is intentionally made from a softer material (dissimilar from the material of the main body of the valve) for being suitable for making a compression connection thereto by a compression sleeve and compression nut.

As shown in FIGS. 4 and 5, the trouble-shooting, quick shut-off valve 14 includes a valve housing 30. The inlet tail-tube fitting 16 forms the inlet end 13 for this valve, being mounted in a threaded socket 32 in the valve housing 30. The fitting 16 has a downstream protruding end portion 34 (FIGS. 7 and 8) with external screw threads 36 adapted to be screwed into this threaded socket 32.

In order to facilitate assembly of the inlet tail-tube fitting 16 into its socket 32, there may be a hexagonal wrench-engageable region 38. A circular rim 40 on fitting 16 abuts against the valve housing 30. An axial bore inlet passage 42 extends through fitting 16, and it has an inside diameter "D" (FIG. 7) corresponding with the conventional inside diameter (I.D.) of a flex-line 10 or 10', for example having a nominal I.D. in a range from about 0.32 of an inch to about 0.21 of an inch, depending upon whether the inlet-tail-tube 15 is made from copper or plastic, or the like, suitably soft malleable material. A copper tail-tube 15 has a bore 42 in the upper portion of this size range, while a plastic tail-tube has a bore in the lower portion of this size range for providing a slightly thicker tubing wall of plastic as compared with copper. The outside diameter "E" of the inlet tail-tube 15 corresponds with the conventional outside diameter (O.D.) of a flex-line 10 or 10', for example having a nominal O.D. of ⅜ths of an inch (a nominal value of 0.375 of an inch). Thus, the O.D. and physical characteristics of the tail-tube 15 are very suitable for making a compression-type connection thereto using a conventional compression nut 22 (FIG. 3) with a conventional compression sleeve 23.

Figure 7:
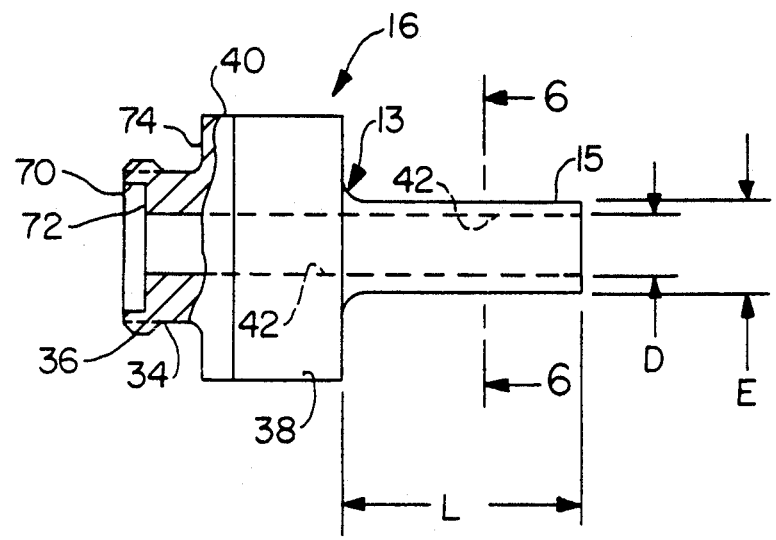
FIG. 7 is a longitudinal view, partly in section, showing the inlet-tail-tube and the tail-tube fitting seen previously in FIGS. 4, 5 and 6.

To make the inlet tail-tube 15 well suited for applying a compression sleeve 23 and compression nut 22 thereto, this tail-tube is fabricated from suitably soft, malleable material, for example such as copper or plastic similar to copper, for example such as the plastic used for fabricating a flex-line 10 or 10'. A convenient method of manufacturing this suitably soft, malleable tail-tube 15 is to make the whole fitting 16 as an integral component all fabricated from the same material, as is shown in FIGS. 4 and 7. Thus, the fitting 16 as a whole may be softer than the material, for example brass, of which the valve housing 30 may be fabricated.

Alternatively, the tail-tube 15 itself may be fabricated from a desired material suitable for a compression connection thereto, and then this tail-tube may be permanently suitably bonded to the remainder of the fitting 16, which may be fabricated from material corresponding with the material of housing 30.

The valve housing 30 has an outlet passage 44, and between this outlet passage and the inlet passage 42 is a valve chamber 46, which interconnects the inlet and outlet passages 42 and 44. Within the valve chamber 46 is positioned a quarter-turn rotatable valve element 48, for example shown as a ball, having a through bore 50 for connecting the inlet and outlet passages when this rotatable element is turned to the "ON" position, as is shown in FIGS. 4 and 5. A rotatable valve stem 52 is mechanically coupled to the rotatable element 48 for turning it into its "ON" and "OFF" positions. This valve stem 52 is shown captured in the valve housing 30 by a nut sleeve 56 screwed into a threaded opening 54 in which the valve stem is located. A washer 58 is held by the nut sleeve 56, and this washer rests against an annular shoulder 60 on the valve stem 52 for capturing it in the opening 54. A locknut 62 is threaded onto the outer end of the valve stem 52 for securing the handle 18 to the valve stem. Another advantage of this L-shaped handle 18 is its compact shape for enabling the valve 14 to fit into a relatively small available space between an existing valve 3 or 7 and a nearby plumbing fixture 12. For example its legs 19 and 21 may be no more than about one and a half inches long, and yet this two-legged handle enables a strong torque to be applied by hand to the valve stem 52.

Figure 8:
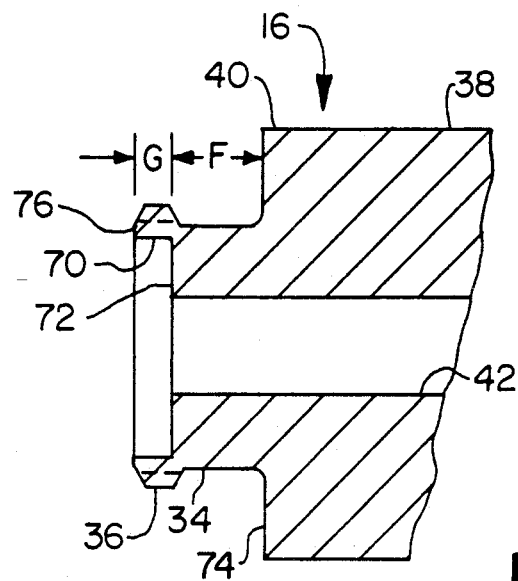
FIG. 8 is a further enlarged longitudinal sectional view of a recessed downstream end portion of the inlet-tail-tube fitting of FIGS. 6 and 7.

Within the valve chamber 46 are a pair of seat seals for receiving the rotatable valve element 48 sandwiched between them. These seat seals are shown as an inlet seat seal 66 and an outlet seat seal 68. In order to position and to retain these respective seals 66, 68 in their seated relationship against the ball element 48, the fitting 16, as seen most clearly enlarged in FIG. 8, is shown having an annular recess 70 in its downstream protruding end portion 34. This annular recess 70 receives and holds the inlet seat seal 66. This annular recess 70 has a radial surface 72 which presses against the upstream side of the inlet seat seal 66 in the assembled valve 14, as shown in FIG. 4.

For providing an appropriate pressure of the seat seals 66, 68 against opposite sides of ball element 48 sandwiched between these seals in assembled relationship, the radial back surface 72 of recess 70 is spaced a predetermined suitable distance "F" from a radial surface 74 adjacent to the circular rim 40 and also is spaced a predetermined suitable distance "G" from the downstream radial face 76 of a rim encircling the recess 70. The distance F is predetermined in relation to the position of the upstream end 78 of the housing 30 encircling the socket 32. The radial surface 74 of fitting 16 is assembled adjacent to this end 78 of the housing. The distance G is predetermined in relation to the axial position of an annular shoulder 80 at the downstream end of the socket 32 and in relation to the desired position of the seat seal 66 to be held against the ball 48 rotatable about axis 82. The radial face 76 of the rim around the recess 70 is assembled adjacent to this annular shoulder 80.

The tail-tube 15 has an axial length "L" (FIG. 7) of at least ⅞ths of an inch for enabling this tail-tube to be inserted into the socket 24 of valve 3 or 7. Such a compression-connection type of socket is often about ⅜ths of an inch deep, and there needs to be sufficient additional available length of the tail-tube for accommodating thereon the loose sleeve 23 and the loose nut 22 in readiness for making the connection to valve 3 or 7. Preferably the length L is at least about one inch.

It is noted that after the plumber has completed repairing or replacing the fixture 12, the plumber may turn the handle 4 of the valve 3 or 7 into its full flow position and then may permanently remove the handle 4 so that a homeowner or subsequent plumber will use only the new valve 14 as the shut-off valve.

The present inventor is not claiming inventorship of ball-type valves per se. The inventor is claiming patentable novelty in the overall structural configuration and interrelationships embodied in this trouble-shooting, quick shut-off valve 14 with its inlet-tail-tube which is conveniently adapted to be directly mounted onto a defective Speedy valve 3 or 7 in series relationship downstream from the defective valve.

In addition to the convenience of employing this valve 14 to solve the difficulties of dealing with a defective valve 3 or 7, this quick shut-off valve is quite well suited for use as a high-quality, easy-to-install, premium valve unit for incorporation in a new plumbing installation.

Since other changes and modifications varied to fit particular operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A quick shut-off valve including a housing with inlet and outlet passages and a valve chamber interconnecting said inlet and outlet passages, a valve element positioned in said valve chamber and being rotatable about an axis between "ON" and "OFF" positions, said ON position being angularly spaced around said axis about one-quarter turn from said OFF position, a valve stem mechanically coupled to said valve element and extending out of said housing with a handle mounted on an outer portion of said valve stem for manually turning said valve element to the ON or OFF position, said valve element in the ON position providing communication between the inlet and outlet passages, said valve element in the OFF position blocking communication between the inlet and outlet passages, said quick shut-off valve characterized by:

being adapted for mounting directly onto an exteriorly-threaded, compression-fitting outlet end of an existing shut-off valve in a plumbing installation, said valve housing having an inlet-tail-tube projecting therefrom, said inlet-tail-tube having the inlet passage extending in an axial direction through said inlet-tail-tube, said inlet-tail-tube having an outside diameter (O.D.) equal to an O.D. nominally used for tubing adapted for compression connection, said inlet-tail-tube being sufficiently long for fully inserting into a socket in the exteriorly-threaded, compression-fitting outlet end of a shut-off valve with additional available length for compression connection means positioned loosely thereon, said inlet-tail-tube being of material suitable for making a compression fitting connection thereto, said inlet-tail-tube projecting from an inlet fitting, said valve housing having an interiorly-threaded socket at an inlet end of said housing, said inlet fitting having an exteriorly-threaded downstream projection, the inlet passage extending in an axial direction through said exteriorly-threaded downstream projection, and said inlet fitting being assembled to the inlet end of the valve housing by screwing said exteriorly-threaded downstream projection into said interiorly-threaded socket.

2. A quick shut-off valve as claimed in claim 1, in which:

said exteriorly-threaded downstream projection of said inlet fitting has a recess therein concentric with the inlet passage, and said recess holds a seat seal against the rotatable valve element.

3. A quick shut-off valve as claimed in claim 2, in which:

the O.D. of said inlet-tail-tube is about ⅜ths of an inch.

4. A quick shut-off valve as claimed in claim 1, in which:

the O.D. of said inlet-tail-tube is about ⅜ths of an inch.

5. A quick shut-off valve as claimed in claim 1, in which:

said inlet-tail-tube has a length of at least about three-quarters of an inch.

6. A quick shut-off valve as claimed in claim 1, in which:

said handle is L-shaped having two legs angularly spaced at about 90° around said axis of rotation, one of said legs has "ON" imprinted thereon, the other of said legs has "OFF" imprinted thereon, said valve housing has a stop member projecting therefrom between said legs, and said valve element is turned into its ON position when the "ON" leg is adjacent to said stop member and said valve element is turned into its OFF position when the "OFF" leg is adjacent to said stop member.

7. A quick shut-off valve as claimed in claim 6, in which:

each leg of said handle does not exceed about one and a half inches in length measured from said axis of rotation.

8. In a quick shut-off valve including a housing with inlet and outlet passages and a valve chamber interconnecting said inlet and outlet passages, a valve element positioned in said valve chamber and being rotatable about an axis between "ON" and "OFF" positions, said ON position being angularly spaced around said axis about one-quarter turn from said OFF position, a valve stem mechanically coupled to said valve element and extending out of said housing with a handle mounted on an outer portion of said valve stem for manually turning said valve element to the ON or OFF position, said valve element in the ON position providing communication between the inlet and outlet passages, said valve element in the OFF position blocking communication between the inlet and outlet passages, an invention characterized in that:

said quick shut-off valve is adapted for mounting directly to an exteriorly-threaded, compression-type fitting outlet of an existing shut-off valve in a plumbing installation, the valve housing has an inlet-tail-tube projecting therefrom, the inlet-tail-tube has the inlet passage extending in an axial direction therethrough, the inlet-tail-tube has an outside diameter (O.D.) equal to an O.D. often used for flexible plumbing tubing of the type adapted for insertion into a socket of a compression-type fitting for enabling a compression connection to be made to the inlet-tail tube, the inlet-tail-tube is sufficiently long for fully inserting into a socket in an exteriorly-threaded, compression-type fitting outlet of a shut-off valve, the inlet-tail-tube has sufficient additional available length for enabling compression connection means to be positioned loosely thereon prior to insertion of the inlet-tail-tube into the socket in the compression-type fitting outlet, the inlet-tail-tube is formed of material suitable for making a compression connection thereto when the inlet-tail-tube has been inserted into the socket in the compression-type fitting outlet of a shut-off valve, the inlet-tail-tube projects from an inlet fitting, the valve housing has an interiorly-threaded socket at an inlet end of the housing, the inlet fitting has an exteriorly-threaded downstream projection, the inlet passage extends in an axial direction through the exteriorly-threaded downstream projection, and the inlet fitting is assembled to the inlet end of the valve housing by screwing the exteriorly-threaded downstream projection into the interiorly-threaded socket in the valve housing.

9. In a quick shut-off valve, the invention as claimed in claim 8, in which:

the exteriorly-threaded downstream projection of the inlet fitting has a recess therein concentric with the inlet passage, and the recess holds a seat seal against the rotatable valve element in the valve housing with the inlet fitting assembled to the inlet end of the valve housing by screwing the exteriorly-threaded downstream projection of the inlet fitting into the interiorly-threaded socket in the valve housing.

10. In a quick shut-off valve, the invention as claimed in claim 9, in which:

the outside diameter of the inlet-tail-tube is about ⅜ths of an inch.

11. In a quick shut-off valve, the invention as claimed in claim 8, in which:

the outside diameter of the inlet-tail-tube is about ⅜ths of an inch.

12. In a quick shut-off valve, the invention as claimed in claim 8, in which:

the inlet-tail-tube has a length of about one inch.

13. In a quick shut-off valve, the invention as claimed in claim 8, in which:

the handle is L-shaped having two legs angularly spaced at about 90° around said axis of rotation, one of the legs has "ON" imprinted thereon, the other of the legs has "OFF" imprinted thereon, the valve housing has a stop member projecting therefrom between the legs of the handle, and the valve element is turned into its ON position when the "ON" leg is adjacent to the stop member and the valve element is turned into its OFF position when the "OFF" leg is adjacent to the stop member.

14. In a quick shut-off valve, the invention as claimed in claim 13, in which:

each leg of the handle does not exceed about one and a half inches in length measured from the axis of rotation of the rotatable valve element.

* * * * *